United States Patent [19]
Mallet

[11] Patent Number: 4,588,061
[45] Date of Patent: May 13, 1986

[54] CLUTCH RELEASE BEARING ASSEMBLY, COUPLING MEMBER FOR SAME AND INSTALLATION AND REMOVAL METHODS FOR SAME

[75] Inventor: Bernard Mallet, Wittelsheim, France

[73] Assignee: Valeo, Paris, France

[21] Appl. No.: 603,287

[22] Filed: Apr. 23, 1984

[30] Foreign Application Priority Data

Apr. 26, 1983 [FR] France ............................ 83 06847

[51] Int. Cl.<sup>4</sup> ............................................. F16D 19/00
[52] U.S. Cl. ................................. 192/98; 192/110 B; 285/321
[58] Field of Search ................ 192/98, 110 B, 70.13, 192/89 B; 285/321

[56] References Cited

U.S. PATENT DOCUMENTS 3,731,955  5/1973  Borsum et al. ................ 285/321 X
4,405,041  9/1983  Broadbent ........................... 192/98
4,502,583  3/1985  Limbacher ..................... 192/110 B

FOREIGN PATENT DOCUMENTS

3113463  12/1982  Fed. Rep. of Germany .
2062799   5/1981  United Kingdom .

Primary Examiner—Stephen F. Husar
Attorney, Agent, or Firm—Charles E. Brown; Charles A. Brown

[57] ABSTRACT

In a clutch release bearing assembly, coupling means operative in traction are disposed between a drive member of the clutch release bearing and a coupling member attached to the clutch release device. These coupling means comprise a coupling ring engaged in a retaining groove formed in one of the members and a driving bearing surface formed on the other member. The coupling member comprises at least one peg, and for preference two pegs, each having an oblique ejection surface.

28 Claims, 13 Drawing Figures

CLUTCH RELEASE BEARING ASSEMBLY, COUPLING MEMBER FOR SAME AND INSTALLATION AND REMOVAL METHODS FOR SAME

BACKGROUND OF THE INVENTION

1. Field of the Invention

The present invention is generally concerned with clutch release berings, for automotive vehicles in particular.

It is more particularly directed to clutch release berings of the so-called "pull" type which are designed to act in traction on the clutch release device of the clutch to be controlled and which, for this purpose, must be coupled to the latter.

2. Description of the Prior Art

In certain clutch release bearing assemblies, and in particular in the clutch release bearing assembly described in French patent application No. 83 05848 filed Apr. 11 1983, it has been proposed to employ for this purpose, disposed between the clutch release bearing and the clutch release device to be controlled, a member which is referred to hereinafter for convenience as the "coupling member" (or "actuator member") which, appropriately attached to said clutch release device, comprises a radial bearing flange on the side of the latter opposite the clutch release bearing, by means of which it is adapted to act thereon, in cooperation with attachment means acting in traction which, disposed between a coupling member of this kind and a member referred to hereinafter for convenience as the "drive member", forming part of the clutch release bearing, are adapted to provide an axial linkage between said members in the axial direction from the clutch release device to said clutch release bearing.

In practice, in French patent application No. 83 05848 mentioned hereinabove, the attachment means acting in traction which are employed consist generally of a coupling member which is elastically deformable in the radial direction and which is carried by one of the members to be coupled together in traction, being designed to cooperate abutment fashion with a driving bearing surface formed generally transversely to this end on the other of these members.

A notable advantage of an arrangement of this kind is that it permits the clutch release device of the clutch to be controlled to be fitted in advance with the coupling member, even before the corresponding clutch cover assembly is assembled, engagement being completed on subsequent asssembly by simple snap-fastener attachment of the clutch release bearing to said coupling member.

In certain of the embodiments proposed in French patent application No. 83 05848 mentioned hereinabove, the elastically deformable coupling member employed is an annual member which has oblique fingers elastically deformable in the radial direction.

Although satisfactory, a coupling member of this kind has the disadvantage of being relatively costly and of requiring a non-negligible force for fitting it.

In other embodiments described in French patent application No. 83 05848 mentioned hereinabove, the coupling member is a ring, referred to hereinafter for convenience as the "coupling ring", which is at least partially engaged in the radial direction in an annular retaining groove provided for it on one of the members to be attached together in traction, the other of these members featuring the driving bearing surface with which it must cooperate for such fastening.

The coupling ring thus employed may, for example, consist of a split ring of circular transverse cross-section featuring spaced and alternating rectilinear sections through which it is engaged without clearance with the bottom of a retaining groove in which it is inserted, at points on a circle of relatively small radius, and part-circular sections of relatively larger radius, through which it is adapted to cooperate with the corresponding driving bearing surface.

As an alternative, the coupling ring employed may consist of a simple split elastic ring of circular contour and rectangular transverse cross-section, engaged with play in the associated retaining groove.

To reduce the disadvantages inherent in this type of assembly, which will not be explained in detail herein, French patent application No. 83 05848 filed Apr. 11 1983 proposes a simplified release bearing assembly of the same type, providing for the use of a coupling ring of circular transverse cross-section and further providing for snap-fastener type attachment which may be effected in a reliable manner without possibility of mis-operation or mistake.

According to this application, that of the flanks of the retaining groove which is on the opposite side of the driving bearing surface to the coupling ring, in the axial direction, is generally oblique to the axis of the assembly, diverging from the other flank of said retaining groove in the direction away from said axis.

Thus in service, that is to say when the drive member of the clutch release bearing is exerting traction on the coupling member, and on the clutch release device of the clutch to be controlled through the intermediary of the latter, the coupling ring operating axially between said members is systematically urged in the direction towards the driving bearing surface with which it must cooperate, so that the amount of room the latter takes up on the relevant member may be relatively small without it being necessary for this purpose to confer a special configuration on said coupling ring.

The release bearing assemblies outlined hereinabove using a coupling ring engaged in a groove formed either in the coupling member or in the drive member are certainly satisfactory with regard to the transmission of traction from the clutch release bearing to the clutch release device of the clutch cover assembly and with regard to facilitating fitting of the clutch release bearing to the clutch cover assembly, effected by a simple clipping action.

However, in these release bearing assemblies, it is not possible to decouple the clutch release bearing from the coupling member except by operating on the coupling ring so as to force it again into the retaining groove, for example using a tool inserted for this purpose between the drive member and the coupling member, from the side of the latter opposite the clutch release bearing, which often involves first unbolting the clutch cover assembly from the flywheel carried by the motor. In many cases it is not possible to provide access for a tool and it is desirable to be able to effect this decoupling, that is to say, in the final analysis, to decouple the motor from the gearbox, without proceeding to remove the clutch cover assembly. On the contrary, and for all the reasons mentioned hereinabove, it is desirable to retain the release bearing assembly by a simple clipping action using a coupling ring engaged in a retaining groove.

The present invention is directed towards an arrangement with which this objective may be achieved, in a simple manner and without significantly increasing the production cost of the clutch release bearing assembly.

SUMMARY OF THE INVENTION

The present invention consists in a clutch release bearing assembly comprising a coupling member adapted to couple said clutch release bearing to a clutch release device of a clutch and to be attached to said clutch release device, a drive member constituting part of said clutch release bearing, and attachment means disposed between and adapted to couple together said coupling member and said drive member in the axial direction from said clutch release device to said clutch release bearing, wherein said attachment means comprise an annular retaining groove in said coupling member or said drive member, an annular coupling ring which is elastically deformable in the radial direction and is at least partially engaged in the radial direction in said retaining groove, a generally transverse driving bearing surface on whichever of said drive and coupling members does not feature said retaining groove, on which said coupling ring is adapted to bear in the axial direction, and wherein that of said drive and coupling members which features said driving bearing surface further comprises at least one peg which is opposite said coupling ring, which projects away fom said driving bearing surface relative to said coupling ring, and which has a retraction surface which is generally oblique relative to the axis of the assembly, diverging from said driving bearing surface.

At least two pegs are preferably provided on the perimeter of the member in question.

The combination of these arrangements makes it possible to achieve the objects mentioned hereinabove, since assembly may be carried out in the conventional manner by simple clipping action and during dismantling it is only necessary to push the coupling member back towards the pegs with the drive member of the release bearing, the retraction surface of the latter, which is generally oblique relative to the axis of the assembly, then obliging the ring to retract again into the retaining groove which the drive member, for example, features, the coupling ring being adapted to return to its initial shape as soon as the thrust exerted on it has caused it to move beyond said pegs. The coupling ring is then once again on the side of the coupling member opposite the clutch release bearing, for example, on the bearing flange which this coupling member features. The release bearing may then be removed, being no longer engaged with the coupling ring.

In another aspect, the present invention consists in a coupling member for use in a clutch release bearing assembly, comprising a driving bearing surface, a coupling ring which cooperates with said driving bearing surface, at least one projecting peg opposite said driving bearing surface which has an ejection surface which is generally oblique relative to the axis of said coupling member diverging from said driving bearing surface in the direction towards said axis, said at least one peg forming in combination with said driving bearing surface a housing for said coupling ring.

In a third aspect the present invention consists in a method of installing a clutch release bearing assembly of the kind in accordance with the invention as defined hereinabove, in which said drive member is coupled to said coupled member with a snap-fastener action involving insertion of said drive member into said coupling member, such insertion being limited so that said coupling ring is not ejected by said at least one peg during such installation.

In a fourth aspect, the present invention consists in a method of removing a clutch release bearing assembly of the kind in accordance with the invention as defined hereinabove, in which the coupling ring is pushed beyond said at least one peg.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIGS. 4A to 4H are views corresponding to that of FIG. 3 to a reduced scale; FIGS. 4A to 4D illustrate the engagement of the clutch release bearing with the coupling member provided for this purpose on the clutch release device concerned, during assembly of the clutch release bearing assembly; FIGS. 4E to 4H illustrate the removal of the release bearing assembly.

DESCRIPTION OF THE PREFERRED EMBODIMENTS

In the chosen embodiments shown by way of example in these figures, the invention is applied to a release bearing assembly of the type described in the aforementioned French patent application No. 83 05848 filed Apr. 11 1983. It will be obvious that the invention may be applied to other types of clip-assembled release bearing assembly employing a coupling ring engaged in a groove comprising a driving bearing surface, such as those outlined in the preamble to the present application, for example.

As illustrated in the figures, it is a matter of coupling a clutch release bearing 10 to the clutch release device 11 of a clutch of any form which is to be controlled.

In the embodiments specifically represented, the clutch release device 11 is, in the manner known per se, formed by the ends of the radial fingers of a diaphragm spring, that is to say an annular member which, being part of the clutch to be controlled, comprises a circumferentially continuous peripheral part forming a Belleville washer adapted to urge the clutch towards the engaged position and a central part subdivided into radial fingers of this kind, in order to constitute the clutch release device.

In a manner also know per se, for the purpose of coupling the clutch release bearing 10 to the clutch release device 11 as is necessary for operation of the clutch release bearing 10 on the clutch release device 11 in traction, there is attached to the latter, by means of a central opening 12 in it, a member 13 referred to hereinafter for convenience as the coupling member.

In the embodiments shown, this coupling (or actuator) member is of the type described in French patent application No. 83 05850 filed Apr. 11 1983.

As a coupling member of this kind does not form part of the present invention, it will not be described in detail here.

It is sufficient to mention that, on the side of the clutch release device 11 opposite the clutch release bearing 10 the coupling member comprises a radial flange 14, referred to as the bearing flange, adapted to act on a clutch release device 11 of this kind, said bearing flange is appropriately shaped to this end, and the coupling member comprises a bush 15 integral with this bearing flange 14 which extends in a generally axial direction through the clutch release device 11, by means of the central opening 12 in the latter, and at the end of which on the same side as the clutch release bearing 10 there are spaced axially projecting lugs 16 carrying circumferentially cantilevered retaining fingers 17 parallel to the bearing flange 14 adapted, in cooperation with this bearing flange 14, to retain the assembly to the clutch release device 11 in the axial direction.

As described in French patent application No. 83 05848 mentioned hereinabove, a coupling member 13 of this kind may be fitted to the clutch release device 11 in a very simple manner by temporary axial bending of the ends of the fingers 11' of the clutch release device 11 on which the retaining fingers 17 must act, followed by rotation of the coupling member 13 around the axis of the assembly so that circumferential engagement of the retaining fingers 17 over the previously bent fingers 11' of the clutch release device 11 takes place, followed finally by releasing of the latter.

In the embodiments shown, the axial bush 15 of the coupling member 13 extends in a generally rectilinear fashion.

Of itself, the clutch release bearing 10 does not form part of the present invention either.

In a manner known per se, it generally comprises a drive part 20 through which it is adapted to act on the clutch release device 11, through the intermediary of the coupling member 13, as will be described in more detail hereinafter, a maneuvering member 22 through which it is designed, in the embodiments shown, to be mounted so as to be slidable in the axial direction on any form of guide member 23, and by means of which it is further adapted to be acted on by a control member 24 consisting, for example and as shown schematically in chain-dotted line in FIGS. 1 and 2, of a clutch release yoke, and means coupling said drive part 20 to said maneuvering member 22 in the axial direction.

In a manner also known per se, the drive part 20 consists, in the embodiments shown, of a ball bearing.

For purposes of cooperation with the coupling member 13, the latter comprises a member 25 referred to hereinafter for convenience as the drive member.

In the embodiments shown, this drive member 25 consists of the inside ring of this ball bearing, which is sufficiently extended in the axial direction towards the clutch release device 11 for this purpose.

In the embodiments shown, and by virtue of arrangements of the kind described in French patent application No. 82 15962 filed Sept. 22 1982, the coupling means which couple the drive part 20 to the maneuvering member 22 in the axial direction consist of a bush 26 which surrounds and is attached in the axial direction to the maneuvering member 22 and extends beyond the outside ring 27 of the ball bearing constituting the drive part 20, comprising a lip 29 at the end of the latter.

This bush also forms laterally, at diametrically opposed positions, two arms 30 for the control member 24 to act on.

As in the embodiments shown the clutch release bearing is of the self-centering type in which the self-centering action is maintained, annular clearance is provided between the bush 26 and the ball bearing constituting the drive part 20. Also, operative between the outside ring 27 of this ball bearing and the maneuvering member 22 are axially acting elastic means consisting, for example and as shown, of a corrugated washer 31 of the type marketed under the trade name "ONDUFLEX".

Figure 1:
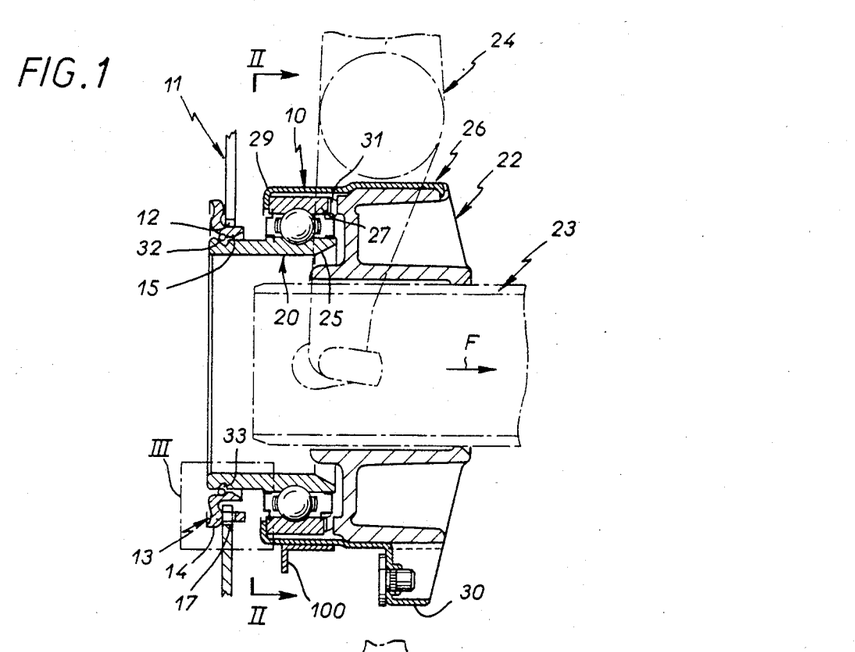
FIG. 1 is a view of a clutch release bearing assembly in accordance with the invention in axial cross-section on the broken line I—I in FIG. 2.
Figure 2:
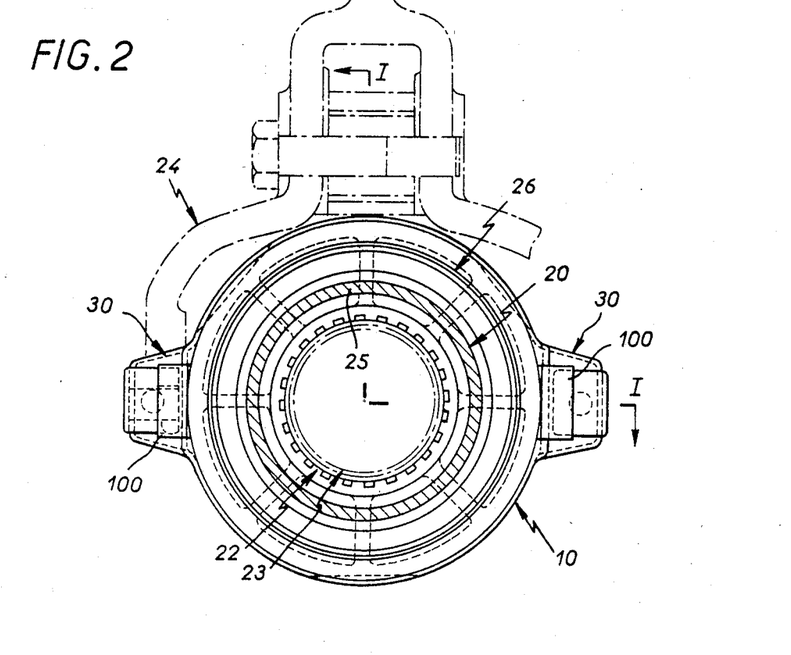
FIG. 2 is a view in transverse cross-section on the line II—II in FIG. 1 of the clutch release beraing that this assembly comprises.
Figure 3:
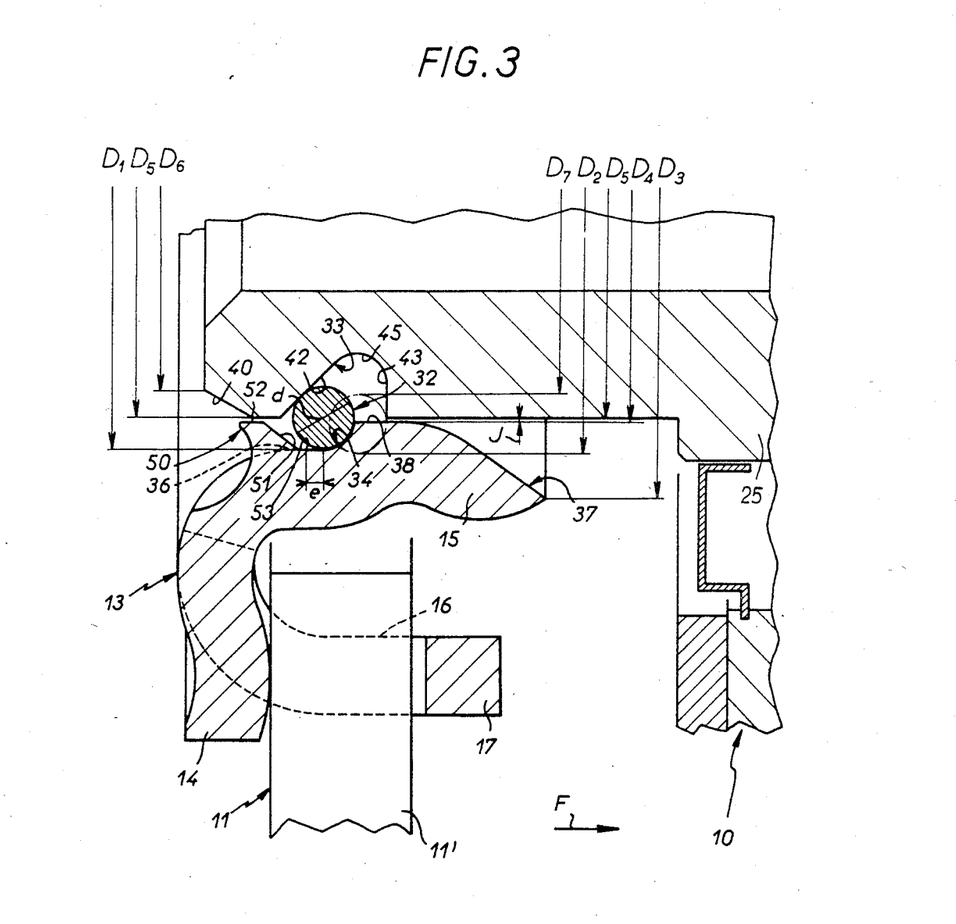
FIG. 3 shows to a larger scale the detail of FIG. 1 marked by the box III thereon.

In a manner also known per se, between the drive member 25 of the clutch release bearing 10 thus constituted on the one hand and the coupling member 13 carried by the clutch release device 11 on the other hand there are disposed coupling means operative in traction adapted to provide axial linkage between said members in the axial direction from said clutch release device 11 to said clutch release bearing 10, as represented schematically by the arrow F in FIGS. 1 and 3.

In the embodiment shown in FIGS. 1 to 4, the drive member 25 is engaged in the bush 15 of the coupling member 13 so that the traction coupling means are operative between the outside surface of said drive member 25 and the inside surface of said bush 15.

They generally comprise, on the one hand, a ring 32 which is elastically deformable in the radial direction and is hereinafter referred to for convenience as the coupling ring, which is at least partially engaged in the radial direction in an annular groove 33 hereinafter referred to for convenience as the retaining groove, formed for it on any of the members between which there must be provided coupling in traction and, on the other hand, a driving bearing surface 34 which is formed generally transversely on the other of said members and with which said coupling ring 32 is designed to cooperate in axial bearing engagement in the direction concerned, that is to say the axial direction indicated by the arrow F in FIGS. 1 and 3.

In the embodiment shown in FIGS. 1 to 4, the retaining groove 33 is formed on the drive member 25 of the clutch release bearing 10 and the associated bearing driving surface is formed on the coupling member 13, more precisely on the axial bush 15 of this coupling member 13.

In practice, the coupling ring 32 is a simple ring of circular contour and circular transverse cross-section, as shown.

It may consist, for example, of a metal ring split by a radial slot.

It may alternatively consist of a ring which is elastically deformable in the radial direction.

Figure 4A:
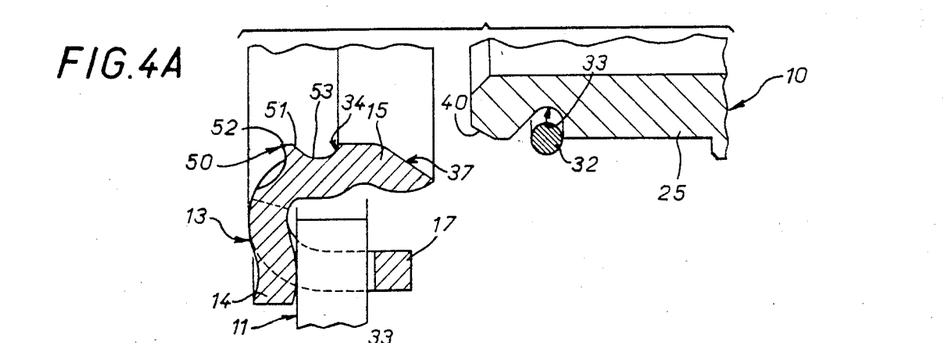

Be this as it may, in the embodiment shown in FIGS. 1 to 4, when not stressed it occupies a configuration in which it projects significantly from the retaining groove 33 with which it is associated, whilst remaining engaged with the latter, as represented schematically in dashed outline in FIG. 3 and as can be seen in full line in FIG. 4A, and it is able to deform elastically in the radial direction towards the axis of the assembly from this rest configuration.

The driving bearing surface 34 which the coupling member 13 features is directed towards the bearing flange 14 of the latter, that is to say away from the clutch release bearing 10.

In the embodiment shown in FIGS. 1 to 4, the profile of this driving bearing surface, as seen in transverse cross-section, is complementary to that of the coupling ring 32.

In other words, in this embodiment, the driving bearing surface 34 is a toroidal surface, its transverse cross-section consisting of a quarter-circle.

Be this as it may, it follows on from a generally cylindrical bearing surface 36 of the bush 15 of the coupling member 13, being disposed at the end of this cylindrical bearing surface 36 and merging with it tangentially.

It will be understood that the diameter D1 of this cylindrical bearing surface 36 on the bush 15 of the coupling member 13 is less than that D2 of the outside contour of the coupling ring 32 in its rest configuration.

On the same side as the clutch release bearing 10, the end of the internal surface of the bush 15 of the coupling member 13 forms a frustoconical engagement bearing surface 37, the concave side of which faces towards said clutch release bearing 10.

This frustoconical engagement bearing surface 37 thus extends from an entry end on the same side as the clutch release bearing 10, the diameter D3 of which is greater than the outside diameter D2 of the coupling ring 32 in the rest configuration, to an opposite, generally cylindrical end 38 on the same side as the asociated bearing flange 14, the diameter D4 of which is slightly greater than that D5 of the outside surface of the drive member 25 of said clutch release bearing 10.

In a similar manner, the drive member 25 of the clutch release bearing 10 has at its free end a frustoconical engagement bearing surface 40 which extends from an entry end, the diameter D6 of which in the example shown is less than that D7 of the overall inside contour of the coupling ring 32 in the rest configuration, to an opposite end of diameter D5.

In the type of release bearing assembly here illustrating the invention, the flank 42 of the retaining groove 33 which is on the opposite side in the axial direction to the driving bearing surface 34 of the coupling member 13 relative to the coupling ring 32 is generally oblique to the axis of the assembly, diverging from the other flank 43 of this retaining groove 33 in the direction away from said axis.

In the embodiment shown in FIGS. 1 to 4, the oblique flank 42 which the retaining groove 33 thus features is that which is farthest in the axial direction from the maneuvering member 22.

For preference the slope of this oblique flank 42 is between 30° and 60°.

It may be approximately 45°, for example and as shown here.

In the embodiment shown in FIGS. 1 to 4, the bottom 45 of the retaining groove 33 has a curved profile in cross-section complementary to that of the coupling ring 32, and thus semi-circular, and its oblique flank 42 merges with this tangentially; as for its other flank 43, this is straight. Be this as it may, the depth of the retaining groove 33 as measured from the outside surface of diameter D5 of the drive member 25 is at least equal to the diameter d of the transverse cross-section of the coupling ring 32 less the inevitable annular clearance $J$ ($J=(D4-D5)/2$) to be provided between this drive member 25 and the bush 15 of the coupling member 13.

Generally speaking, with the coupling means thus constituted there are associated axially acting elastic means adapted to continuously urge the coupling ring 32 in the direction towards the driving bearing surface 34 with which it must cooperate.

In the embodiment shown in FIGS. 1 to 4, these axially acting elastic means are replaced with a continuous load which is in traction, that is to say in the direction represented in FIG. 3 by the arrow F. This continuous traction load may be obtained, for example, by appropriate adjustment of the clutch release yoke.

This traction provides not only for urging the coupling ring 32 in the direction towards the driving bearing surface 34, but also provides for elastic retention of the bearing flange 14 of the coupling member 13 against the clutch release device 11 and, by virtue of the corresponding contact friction, rotational interlocking of the clutch release bearing 10 to the coupling member 13 and, via the latter, to the clutch release device 11.

In accordance with the invention, the member comprising the driving bearing surface 34 comprises at least one peg 50 referred to also as an ejector peg, facing the coupling ring 32, and for preference two of these pegs. These pegs project opposite the driving bearing surface 34, relative to said coupling ring 32, each peg 50 having a surface 51 called the ejection surface which is generally oblique relative to the axis of the assembly, diverging from the driving bearing surface 34.

The ejection surface 51 forms with the driving bearing surface 34 a housing for the coupling ring 32.

In the embodiment shown in FIGS. 1 to 4, the pegs 50 are formed on the coupling member 13. More precisely, the pegs 50 are formed on the cylindrical bearing surface 36 on the bush 15 of said coupling member 13. The ejection surface 51 of each of the pegs merges tangentially with the cylindrical bearing surface 36, with a curvature which is substantially complementary to that of the ring 32.

In the embodiment shown, an axial gap e is left between the junction 53 of the ejection surface 51 and the driving bearing surface 34 on the cylindrical bearing surface 36 of the bush 15, so that in the operative position of the clutch the pegs 50 are spaced axially from the coupling ring 32.

Each peg 50 advantageously comprises a horizontal retaining surface 52.

In the embodiment shown, the coupling member 13 comprises two pegs disposed in the vicinity of the finger 16 carrying circumferentially a retaining finger 17.

There will now be described, with reference to FIGS. 4A to 4H, the coupling of the clutch release bearing 10 to the clutch release device 11, that is to say the installation of the release bearing assembly in accordance with the invention shown in the figures and the decoupling of the parts of this assembly.

The coupling member 13 being in place on this clutch release device 11, the coupling ring 32 is positioned in advance on the clutch release bearing 10, more precisely on the drive member 25 of the latter, in the retaining groove 33 provided for this purpose (FIG. 4A).

As will be easily understood, the positioning of the coupling ring 32 on the drive member 25 is facilitated by the frustoconical engagement bearing surface 40 which the latter features for this purpose.

Figures 4B, 4C:
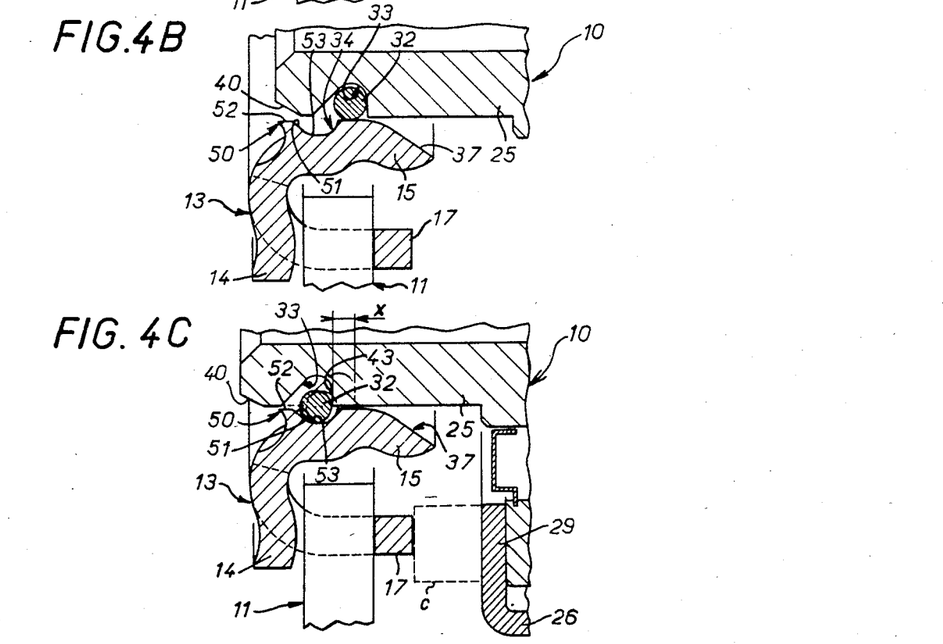

The clutch release bearing 10 and the coupling member 13 are then brought closer together in the axial direction, the drive member 25 of the clutch release bearing 10 being engaged within the bush 15 of the coupling member 13 (FIG. 4B).

In view of the inevitable manufacturing clearance between the coupling member 13 and the clutch release device 11, there is then limited axial entrainment of said coupling member 13 by the clutch release bearing 10, until its retaining fingers 17 come to bear on the side of the clutch release device 11 facing towards the clutch release bearing 10.

Conjointly, by virtue of the frustoconicial engagement bearing surface 37 on the coupling member 13, the coupling ring 32 is moved into the retaining groove 33 in the drive member 25 of the clutch release bearing 10.

Arriving at the righthand end of the driving bearing surface 34 of the coupling member 13, it again becomes elastically deployed and thus engaged with said driving bearing surface 34.

In practice, the engagement movement of the clutch release bearing 10 is systematically continued so as to be sure that the coupling ring 32 has actually deployed, this engagement movement being limited, however, as will be explained hereinafter (FIG. 4C).

Figure 4D:
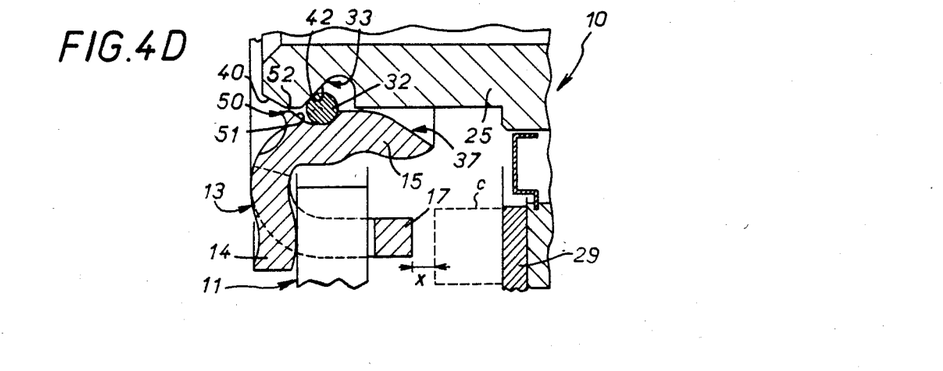

Subsequently, traction is exerted on the release bearing 10, for example, by means of the clutch release yoke 24, so that there is a retrograde movement of the clutch release bearing 10 relative to the coupling member 13 causing the oblique flank 42 of the retaining groove 33 on the drive member 25 of this clutch release bearing 10 to come into contact with the coupling ring 32, and to urge the latter obliquely in the direction towards the driving bearing surface 34 of the coupling member 13 (FIGS. 4D, 1 and 3).

The required snap-fastener action is thus obtained in a reliable manner.

In service, when the clutch release bearing 10 exerts traction on the coupling member 13, and through the intermediary of the latter, on the clutch release device 11, in the direction of the arrow F, the oblique flank 42 of the retaining groove 33 in which the coupling ring 32 is engaged likewise urges the latter obliquely towards the driving bearing surface 34 of the coupling member 13, which confirms the snap-fastener action previously obtained and enables the required control action.

There will now be described with reference to FIGS. 4C, 4E and 4H the decoupling of the clutch release bearing 10 and the coupling member 13, rigidly attached to the clutch release device 11 which, by virtue of the peg 50 in accordance with the invention, may be effected blind, without unbolting the clutch cover assembly from the reaction plate, and, in the embodiment shown in FIGS. 1 to 4, without using any special tool to retract the coupling ring 32.

As shown in these figures, decoupling is obtained by exerting an axial thrust on the coupling ring 32 by means of the straight flank 43 of the retaining groove 33 which the drive member 25 incorporates.

In FIG. 4C, which also illustrates one stage in assembly, the coupling ring 32, which is subject to a force in the opposite direction to that shown by the arrow F, comes initially to the position of the junction 53 between the ejection surface 51 and the cylindrical bearing surface 36 of the bush 15.

Figure 4E:
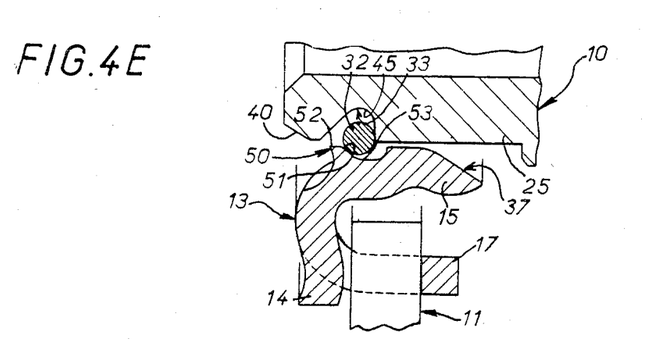

In FIG. 4E the thrust to which the coupling ring 32 is subjected because of the straight flank 43 of the retaining groove 33 moves along the ejection surface 51. It contracts and becomes engaged more deeply in the retaining groove 33.

Figure 4F:
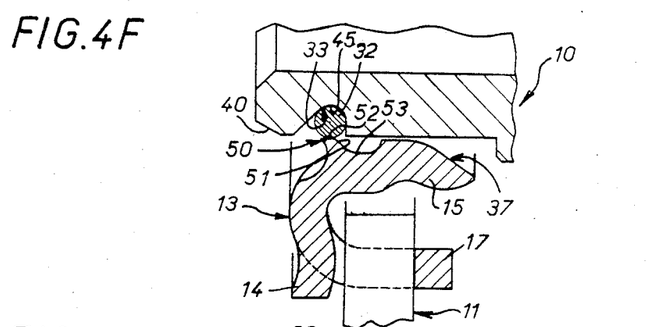

The coupling ring 32 continues to be subject to a thrust and comes then into contact with the retaining surface 52 of each of the pegs 50. Conjointly, the coupling ring 32 is forced on to the bottom 45 of the groove 43 (FIG. 4F).

Figure 4G:
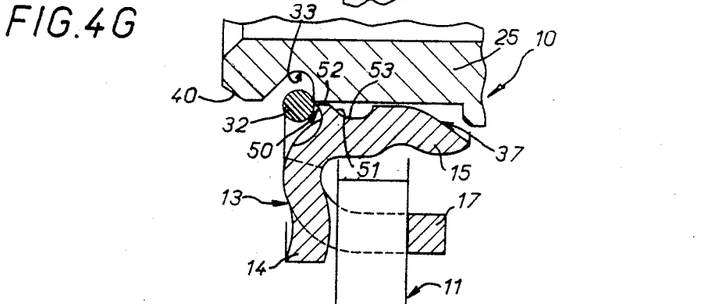

The coupling ring remains on the bottom of the groove 33 for as long as it is moved along the retaining surface 52. Once it has moved beyond this surface, the coupling ring resumes its initial shape (FIG. 4G). It is then partially engaged in the retaining groove 33.

Figure 4H:
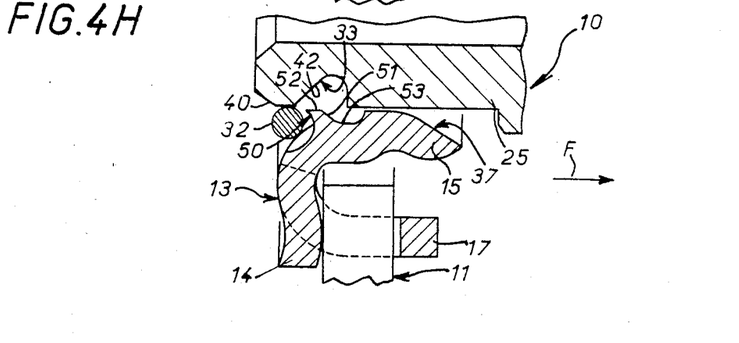

The coupling ring 32 is then disengaged by exerting traction on the clutch release bearing 10, in the clutch release direction indicated by the arrow F (FIG. 4H). It will be noted that the combination of the retaining groove 33 comprising an oblique flank 42 with the pegs 50 in accordance with the invention is particularly advantageous in that this flank provides for moving the coupling ring 32, during this traction, towards the outside surface of the drive member 25 of the clutch release bearing 10.

In the position shown in FIG. 4H, the release bearing 10 may be easily removed from the clutch cover assembly. The coupling ring 32, which remains inside said assembly, may then be recovered.

It was explained hereinabove that, in order to be sure that the coupling ring 32 has actually deployed during assembly, the movement to engage the release bearing is systematically continued beyond the driving bearing surface 34. Traction is then exerted so as to apply the coupling ring 32 against the driving bearing surface 34.

Nevertheless, care must be taken not to continue this engagement movement of the release bearing 10 beyond a certain limit. If not, the pegs 50 would fulfil their function and there would be the risk of ejecting the coupling ring instead of placing it in its operating position between the oblique flank 42 and the driving bearing surface 34.

In accordance with the invention, the axial distance e between the junctions of the ejection surface 51 with the cylindrical bearing surface 36 on the one hand and between the driving bearing surface 34 and the cylindrical bearing surface 36 on the other hand is made sufficiently large to enable the engagement movement of the release bearing during assembly to be continued to a sufficient distance to ensure correct deployment of the coupling ring 32. This axial distance e may be equivalent to a fraction of the diameter d of the transverse cross-section of the coupling ring 32, this fraction being one sixth, for example.

It is then possible to limit the engagement movement of the release bearing 10 during assembly so that the coupling ring 32 is not pushed beyond the junction 53 between the ejection surface 51 and the cylindrical bearing surface 36 of the coupling member 13 (FIG. 4C).

Limiting means may be provided, in accordance with the invention, to limit this engagement travel.

Limiting means of this kind may consist of a chock c represented schematically in dashed line in FIGS. 4C and 4D, which may be disposed facing the finger 17 of the coupling member 13 on the rim 29 of the cover 26 of the release bearing 10. The thickness of the chock c is made such that it comes into contact with the finger 17 as soon as the release bearing is engaged in the coupling member, so that the coupling ring 32 is level with the junction 53 between the ejection surface 51 and cylindrical bearing surface 36. The chock is arranged to permit a free travel x (FIGS. 4C, 4D) corresponding to the distance which exists in the operating position of the assembly (FIG. 4D) between the straight flank 43 of the groove 33 and the coupling ring 32 plus the axial distance e. This chock is naturally removed once assemby is completed.

In an alternative arrangement, assembly relies on cooperation between the clutch release yoke 24 and small, so-called assembly lugs 100 disposed on the cover 26. The yoke is moved in the direction of thrust, that is to say opposite to the direction of the arrow F, so that the dimension x mentioned hereinabove is not exceeded and so that the coupling ring 32 does not move beyond the junction 53 between the ejection surface 51 and the cylindrical bearing surface 36.

The retaining surface 52 also has a security function if, for whatever reason, the coupling ring 32 is forced beyond the junction 53 by the ejection surface 51, before its final ejection. It is then necessary, to finally eject it, that it be pushed along this retaining surface 52.

Figure 5:
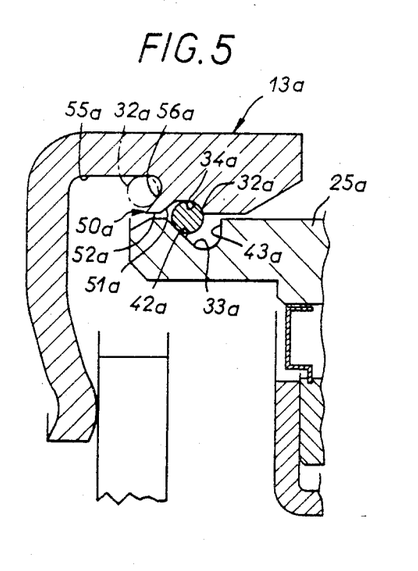
FIGS. 5 and 6 are views corresponding to FIG. 3, to a different scale and illustrating two alternative embodiments of a clutch release bearing assembly in accordance with the invention.
Figure 6:
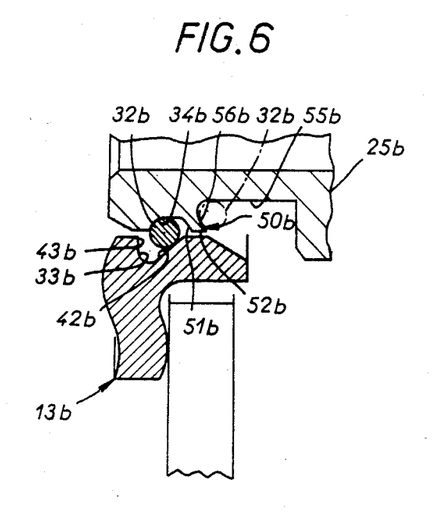

FIGS. 5 and 6 show two alternative embodiments of the release bearing assembly in accordance with the invention.

Parts in these figures equivalent to those in FIG. 3 retain the same reference numerals, to which have been added the suffix "a" for the FIG. 5 embodiment and the suffix "b" for the FIG. 6 embodiment.

In the embodiment shown in FIG. 5, the coupling member 13a is attached snap-fastener fashion to the inside of the drive member 25a.

As in the embodiment shown in FIGS. 1 to 4, the drive member 25a comprises a retaining groove 33a having an oblique flank 42a and a straight flank 43a. The coupling member 13a comprises the driving bearing surface 34a and at least one ejection peg and for preference at least two of these pegs 50a.

In this embodiment, the coupling ring 32a is elastically deformable in the radial direction and in the rest position has a diameter which is substantially less than that in its working position. The rest position is shown in chain-dotted line in FIG. 5.

It will be noted that during dismantling, because of the action of the ejection surface 51a of the pegs 50a, the coupling ring is deployed so as lodge in the retaining groove 33a. It is held there by the retaining surface 52a. As soon as this surface has moved on, the coupling ring 32a may again retract. It is then accommodated in a reception housing consisting on the one hand of a cylindrical reception bearing surface 55a which the coupling member 13a features and, on the other hand, of an inclined reception surface 56a with which the peg 50a is provided for this purpose.

FIG. 6 shows an embodiment in which the retaining groove 33b is carried by the coupling member 13b. This retaining groove 33b comprises an oblique flank 42b and a straight flank 43b. The drive member 25b of the release bearing comprises a driving bearing surface 34b and at least one and for preference at least two ejection pegs 50b.

Here again the retaining ring 32b is substantially deployed in the working position, whereas in the rest position it is of smaller diameter, as shown in chain-dotted line in FIG. 6. The ejection peg 50b comprises an inclined ejection surface 51b, a retaining surface 52b and an inclined reception surface 56b. This retaining surface 56b constitutes, with a cylindrical bearing surface 55b formed in the drive member 25b, a housing for the coupling ring 32b in the final stage of dismantling.

In this embodiment, dismantling is effected by pushing on the drive member 25b, the ejection pegs 50b pushing the coupling ring 32b into the retaining groove 33b by means of their ejection surface 51b. The retaining surface 52b holds the coupling ring 32b on the bottom of the retaining groove 33b until this retaining surface 52b is passed over. The coupling ring, as explained hereinabove, then enters the housing constituted by the bearing surface 55b and the reception surface 56b.

It will be understood that various changes in the details, materials and arrangements of parts, which have been herein described and illustrated in order to explain the nature of the invention, may be made by those skilled in the art within the principle and scope of the invention as expressed in the appended claims.

For example, in the embodiments shown in FIGS. 1 to 6, the ejection pegs 50, 50a and 50b are of substantially restricted circumferential extent. It will be understood that, in other embodiments not described herein, these pegs could have any circumferential extent, and in particular extend over the major part of the circumference.

Also, the drive member or the coupling member could comprise only one annular peg extending in this case over the entire circumference of the member.

I claim:

1. Clutch release bearing assembly comprising a coupling member adapted to couple a clutch release bearing to a clutch release device of a clutch and to be attached to said clutch release device, said clutch release bearing having a drive member, attachment means disposed between and adapted to couple together said coupling member and said drive member in the axial direction from said clutch release device to said clutch release bearing, said attachment means comprising an annular retaining groove in a selected one of said coupling member and said drive member, a radially elastically deformable annular coupling ring at least partially radially engaged in said retaining groove, a generally transverse driving bearing surface on the nonselected one of said drive member and said coupling member against which said coupling ring is adapted to bear in the axial direction, and wherein said selected one of said drive member and said coupling member further comprises at least one peg projecting away from said driving bearing surface relative to said coupling ring and having a retraction surface which is generally oblique relative to the axis of the assembly angling away from said driving bearing surface.

2. Assembly according to claim 1, wherein one flank of said retaining groove which is on the opposite side of said coupling ring to said driving bearing surface is generally oblique relative to the axis of the assembly angling away from the other flank of said retaining groove in the direction away from said axis.

3. Assembly according to claim 1, wherein said at least one peg projects from said coupling member.

4. Assembly according to claim 1, wherein said at least one peg is formed in one piece with the selected one of said drive member and said coupling member.

5. Assembly according to claim 1, wherein said at least one peg is of limited dimension in the circumferential direction.

6. Assembly according to claim 1, wherein said at least one peg extends over the major part of the circumference of the selected one of said drive member and said coupling member.

7. Assembly according to claim 1, wherein said at least one peg is spaced from said coupling ring in the axial direction.

8. Assembly according to claim 1, wherein said at least one peg further comprises a horizontal retaining surface.

9. Assembly according to claim 1, wherein the selected one of said drive member and said coupling member comprises at least two pegs.

10. Assembly according to claim 1, further comprising means adapted to limit insertion of said driving member into said coupling member during installation of the assembly.

11. Assembly according to claim 10, wherein said limiting means comprise a chock.

12. Assembly according to claim 11, wherein said clutch release bearing comprises a cap with a rim on which said chock is mounted, opposite said coupling member.

13. Assembly according to claim 10, wherein said clutch release bearing is adapted to be inserted into said coupling member by a clutch release yoke, and means are provided to limit displacement of said yoke so as to limit the degree of movement of said drive member into said coupling member to a predetermined value.

14. Assembly according to claim 1, wherein said at least one peg further comprises an inclined reception surface.

15. Assembly according to claim 14, wherein said at least one peg projects from said drive member.

16. Assembly according to claim 15, wherein said drive member further comprises a cylindrical reception bearing surface which forms with said reception surface a reception housing for said coupling ring.

17. Coupling member for use in a clutch release bearing assembly, said coupling member comprising a driving bearing surface cooperable with a coupling ring, at least one projecting peg opposite said driving bearing surface which has an ejection surface which is generally oblique relative to the axis of said coupling member angling from said driving bearing surface in the direction towards said axis, said at least one peg forming in combination with said driving bearing surface a housing for said coupling ring.

18. Member according to claim 17, in which said at least one peg is formed in one piece with said coupling member.

19. Member according to claim 17, wherein said coupling member has a cylindrical bearing surface and said at least one peg is disposed on said coupling member so that an axial gap is defined between the junction of said ejection surface and that of said driving bearing surface on said cylindrical bearing surface.

20. Member according to claim 17, wherein said at least one peg further comprises a horizontal retaining surface.

21. Member according to claim 17, wherein said at least one peg is of limited dimension in the circumferential direction.

22. Member according to claim 17, wherein said at least one peg further comprises an inclined reception surface.

23. Member according to claim 22, further comprising a cylindrical reception bearing surface which forms with said reception surface a reception housing for said coupling ring.

24. Member according to claim 17, wherein at least two said pegs are provided.

25. Method of installing a clutch release bearing assembly, said method comprising the steps of providing a clutch release bearing assembly of the type including a coupling member adapted to couple a clutch release bearing to a clutch release device of a clutch and to be attached to said clutch release device, said clutch release bearing including a drive member, attachment means disposed between and adapted to couple together said coupling member and said drive member in the axial direction from said clutch release device to said clutch release bearing, said attachment means comprising an annular retaining groove in a selected one of said coupling member and said drive member, a radially elastically deformable annular coupling ring at least partially engaged in the radial direction in said retaining groove, a generally transverse driving bearing surface on the nonselected one of said drive member and said coupling member against which said coupling ring is adapted to bear in the axial direction, the selected one of said drive member and said coupling member further comprises at least one peg which projects away from said driving bearing surface relative to said coupling ring and has a retraction surface which is generally oblique relative to the axis of the assembly, angling away from said driving bearing surface, coupling said drive member to said coupling member with snap action including inserting said drive member into said coupling member, and limiting the insertion of said drive member into said coupling member so that said coupling ring is not ejected by said at least one peg during such installation.

26. Method according to claim 25, wherein the step of limiting of the insertion of said drive member into said coupling member comprises fitting to said clutch release bearing a chock adapted to come into contact with said coupling member as soon as said drive member is inserted to a predetermined axial depth in said coupling member.

27. Method according to claim 25, wherein the snap action involving a clutch release yoke, wherein limited displacement of said yoke limits the insertion of said clutch release bearing to a predetermined value.

28. Method according to claim 27, further comprising the step of removing the clutch release bearing assembly including pushing the coupling ring beyond said at least one peg.

* * * * *